(12) United States Patent
Siddiqi et al.

(10) Patent No.: US 12,429,330 B2
(45) Date of Patent: Sep. 30, 2025

(54) OPTICAL TACTILE SENSOR AND METHOD FOR ESTIMATING SHAPE FROM TOUCH

(71) Applicant: SAMSUNG ELECTRONICS CO., LTD., Suwon-si (KR)

(72) Inventors: Kaleem Siddiqi, Montreal (CA); Affan Jilani, Pointe-Claire (CA); Charlotte Morissette, Montreal (CA); Francois Hogan, St-Jean-sur-Richelieu (CA); Michael Jenkin, Toronto (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 18/378,447

(22) Filed: Oct. 10, 2023

(65) Prior Publication Data

US 2024/0310162 A1 Sep. 19, 2024

Related U.S. Application Data

(60) Provisional application No. 63/452,369, filed on Mar. 15, 2023.

(51) Int. Cl.
*G01B 11/24* (2006.01)
*G01B 5/20* (2006.01)
*G06T 7/50* (2017.01)

(52) U.S. Cl.
CPC ............... *G01B 11/24* (2013.01); *G01B 5/20* (2013.01); *G06T 7/50* (2017.01)

(58) Field of Classification Search
None
See application file for complete search history.

(56) References Cited

U.S. PATENT DOCUMENTS

| 11,628,576 B2 | 4/2023 | Alspach et al. | |
| 2003/0178556 A1* | 9/2003 | Tachi | G06F 3/042 250/208.1 |
| 2023/0251149 A1* | 8/2023 | Adelson | G01L 5/0061 73/862.624 |

FOREIGN PATENT DOCUMENTS

| CN | 113733128 B | 3/2023 |
| KR | 10-2166691 B1 | 10/2020 |
| WO | 2018/119771 A1 | 7/2018 |

* cited by examiner

*Primary Examiner* — Heather R Jones
(74) *Attorney, Agent, or Firm* — Sughrue Mion, PLLC (57) ABSTRACT

A method performed by an optical tactile sensor comprising a camera, includes: measuring a plurality of relations between the optical tactile sensor and an object; detecting a contact of a membrane on the object; detecting a plurality of markers on the membrane; performing a plurality of first operations by using a tactile perception module; and performing a second operation by using a three-dimensional (3D) perception module, based on a result of the performing of the plurality of first operations.

15 Claims, 8 Drawing Sheets

OPTICAL TACTILE SENSOR AND METHOD FOR ESTIMATING SHAPE FROM TOUCH

CROSS-REFERENCE TO RELATED APPLICATION(S)

This application is based on and claims priority under 35 U.S.C. § 119 to U.S. Provisional Patent Application No. 63/452,369, filed on Mar. 15, 2023 in the U.S. Patent & Trademark Office, the disclosure of which is incorporated by reference herein in its entirety.

BACKGROUND

1. Field

The disclosure relates to a method and a tactile sensor for estimating shape from touch.

2. Description of Related Art

Vision-based tactile sensors have emerged as a leading technology to enable robots to manipulate objects more precisely by reasoning about the object's physical properties. Robots have been shown to leverage tactile feedback to localize and identify objects, sense shape, surface texture, and to detect motion, and force.

Tactile sensing affords abundant capabilities for contact-rich object manipulation tasks including grasping and placing. Some existing optical tactile sensors image a deformable membrane as it interacts with physical structures in the world, and utilize photometric stereo to recover surface shape from the resulting tactile imprints. This provides high spatial resolution reconstructions, but also requires careful lighting, calibration, training, and tuning that are specific to fixed lighting conditions and sensor instantiations.

For example, a photometric stereo approach is used in many existing optical tactile sensors. However, the photometric stereo approach requires a procedure of exacting sensor fabrication and lighting control and expensive network training and system calibration. Thus, there is a need to develop a simpler approach that may provide similar or superior results to the more complex photometric stereo approach.

SUMMARY

The disclosure is directed to a complementary approach that enables estimating contact shape for tactile sensors that is inspired by the classic shape-from-texture problem in computer vision. The sensor's membrane surface is augmented with visually distinct markers and develop a shape-from-texture inspired method to recover qualitative contact surface shape in real time, without expensive network training and without resorting to complex assumptions related to lighting, sensor geometry or marker placement.

According to an aspect of the disclosure, a method performed by an optical tactile sensor comprising a camera, includes: measuring a plurality of relations between the optical tactile sensor and an object; detecting a contact of a membrane on the object; detecting a plurality of markers on the membrane; performing a plurality of first operations by using a tactile perception module; and performing a second operation by using a three-dimensional (3D) perception module, based on a result of the performing of the plurality of first operations.

According to another aspect of the disclosure, an optical tactile sensor includes: a membrane; a plurality of markers on the membrane; a memory; a camera; at least one processor operatively connected to the memory, the at least one processor configured to: measure a plurality of relations between the optical tactile sensor and an object, detect a contact of the membrane on the object, detect the plurality of markers, perform a plurality of first operations by using a tactile perception module in the memory, and perform a second operation by using a three-dimensional (3D) perception module in the memory, based on a result of the plurality of first operations.

According to another aspect of the disclosure, a method performed by an optical tactile sensor for reconstructing a three-dimensional (3D) shape of an object from touch, includes: inferring the 3D shape of the object from a 3D depth extracted from a deformation of markers by the object being in contact with the markers, the markers being provided on a planar surface; and reconstructing the object's 3D shape by capturing the deformation of the markers, wherein the deformations of the marker are associated with a motion of the planar surface.

BRIEF DESCRIPTION OF THE DRAWINGS

The above and other aspects and features of embodiments of the disclosure will be more apparent from the following description taken in conjunction with the accompanying drawings, in which.

DETAILED DESCRIPTION

Example embodiments address at least the above problems and/or disadvantages and other disadvantages not described above. Also, the example embodiments are not required to overcome the disadvantages described above, and may not overcome any of the problems described above.

Example embodiments are described in greater detail below with reference to the accompanying drawings. In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another. The term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods are not limited to the implementations. Thus, the operation and behavior of the systems and/or methods are described herein without reference to specific software code, it being understood that software and hardware may be designed to implement the systems and/or methods based on the descriptions herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The text and figures are provided solely as examples to aid the reader in understanding the invention. They are not intended and are not to be construed as limiting the scope of this disclosure in any manner. Although certain embodiments and examples have been provided, it will be apparent to those skilled in the art based on the disclosure herein that changes in the embodiments and examples shown may be made without departing from the scope of this disclosure.

While the embodiments of the disclosure have been described with reference to the figures, it will be understood by those of ordinary skill in the art that various changes in form and details may be made therein without departing from the spirit and scope as defined by the following claims.

Figure 1:
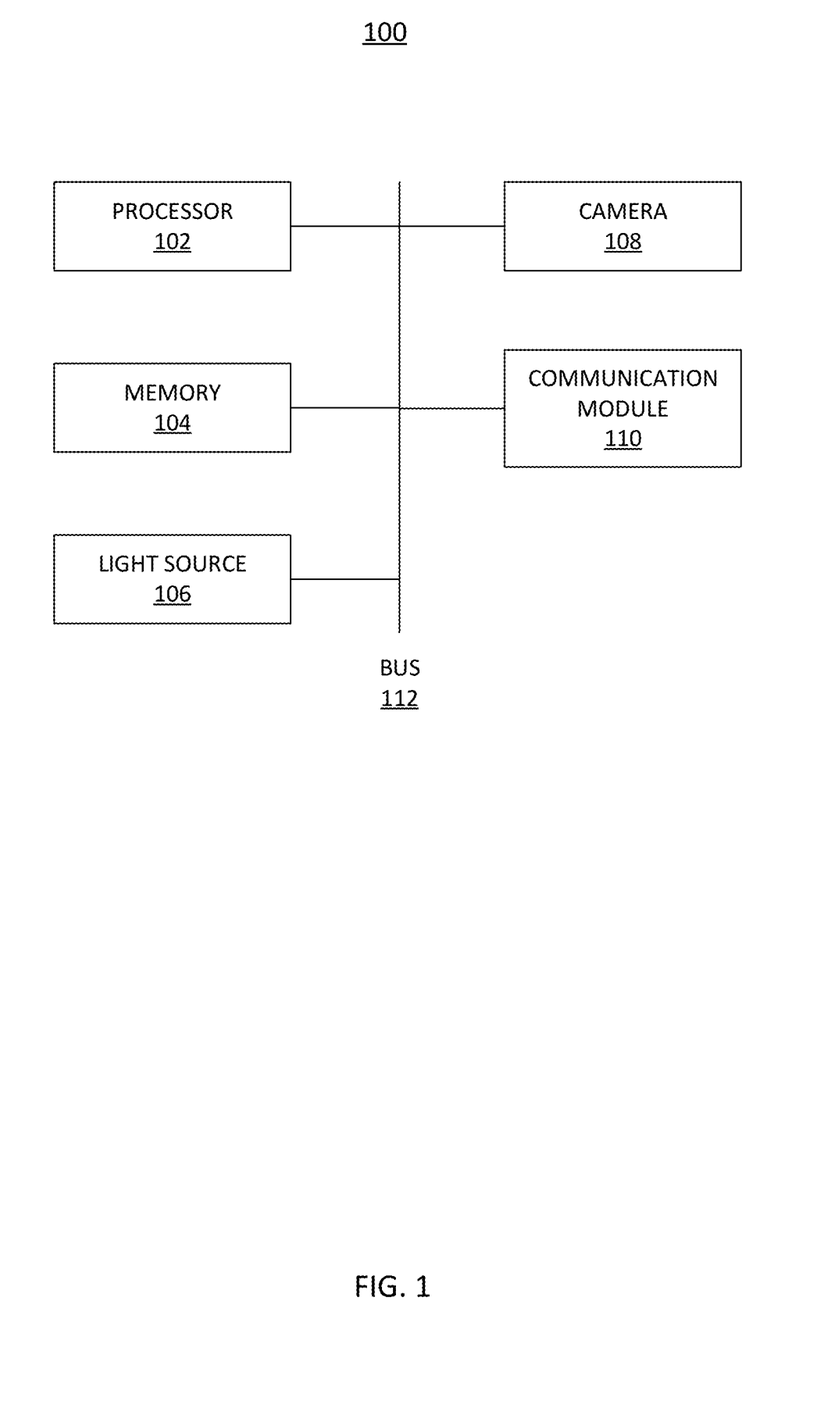
FIG. 1 example components of an optical tactile sensor in accordance with embodiments of the disclosure.

FIG. 1 illustrates example components of an optical tactile sensor in accordance with embodiments of the disclosure. As shown, the optical tactile sensor 100 may include a processor 102, a memory 104, a light source 106, a camera 108, a communication module 110, and a bus 112.

In one embodiment, the processor 102 may be implemented in hardware, firmware, or a combination of hardware and software. The processor 102 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In one embodiment, the processor 102 may include one or more processors capable of being programmed to perform a function.

In one embodiment, the memory 104 may include a random access memory (RAM), a read only memory (ROM), and/or another type of dynamic or static storage device (e.g., a flash memory, a magnetic memory, and/or an optical memory) that stores information and/or instructions for use by the processor 102. In one embodiment, the memory 104 may store information and/or software related to the operation and use of the optical tactile sensor 100. For example, the memory 104 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

In one embodiment, the light source 106 may be controlled by the processor 102 to illuminate an internal structure of the optical tactile sensor. In one embodiment, the light source 106 may be controlled by the processor 102 to illuminate an object in close proximity to the optical tactile sensor. In one embodiment, the processor 102 may turn on or turn off the light source 106.

In one embodiment, the camera 108 may include a lens or multiple lenses to capture an image of the object close proximity to the optical tactile sensor. The camera 108 may be operatively connected with the processor 102, thus the processor 102 may control the camera 108, for example, based on software stored in the memory 104. In one embodiment, the camera 108 may produce signals or images that may be processed by the processor 102 and stored in the memory 104.

In one embodiment, the communication module 110 may include a transceiver-like component (e.g., a transceiver and/or a separate receiver and transmitter) that enables the optical tactile sensor 100 to communicate with other devices, such as via a wired connection, a wireless connection, or a combination of wired and wireless connections. The communication module 110 may permit the optical tactile sensor 100 to receive information from another device and/or provide information to another device. For example, the communication module 110 may include an Ethernet interface, an optical interface, a coaxial interface, an infrared interface, a radio frequency (RF) interface, a universal serial bus (USB) interface, a Wi-Fi interface, a cellular network interface, or the like. In one embodiment, the communication module 110 may be a communication 'interface' used to connect the optical tactile sensor 100 with the other devices.

In one embodiment, the bus 112 may a component that permits communication among the above-described components of the optical tactile sensor 100.

The number and arrangement of components shown in FIG. 1 are provided as an example. In one embodiment, the optical tactile sensor 100 may include additional components, fewer components, different components, or differently arranged components than those shown in FIG. 1. Additionally or alternatively, a set of components (e.g., one or more components) of the optical tactile sensor 100 may perform one or more functions described as being performed by another set of components of the optical tactile sensor 100.

This disclosure relates to estimating or reconstructing an object's three-dimensional (3D) shape from tactile measurements, for example, by using a tactile sensor. The inference of surface shape from touch may be an important robotic skill that enables tasks that require precise object manipulation, such as object pose estimation, placement, insertion, and part assembly.

In the related art, the leading object shape reconstruction methods from tactile sensing rely on the photometric stereo algorithm that estimates a 3D surface map of the object by recording the reflectance of light from multiple angles. While such methods have been shown to provide accurate and dense object geometry measurements, they require careful sensor fabrication and calibration, and software learning and tuning. This is largely due to the fact that some photometric stereo approaches make a number of assumptions about the sensor, namely, the surface is Lambertian, the lighting source is uniform, and the surface is smooth.

In one embodiment of the disclosure, the contact geometry of an object is estimated by analyzing the deformation of an initial texture pattern including markers (e.g., opaque markers) that are printed on the membrane. The disclosure may be generalized across sensors, and may be compatible with a large number of existing optical tactile sensors in use. Furthermore, the disclosure may be directly applied when using such sensors under quite general lighting conditions to recover, estimate, or reconstruct contact surface shape, if the markers on the membrane surface may be visually distinct and the markers may be segmented.

The disclosure is based on shape from texture, where the deformations of a textured pattern on the surface of the sensor are analyzed to reconstruct the object geometry. While the method reduces the resolution of the estimated object geometry to the collection of marker locations, the method may not make any assumptions on the internal lighting of the sensor and only requires the detection of markers on its surface. In one embodiment, the markers may be organized in a grid (e.g., N×N) and of the same shape and size. In another embodiment, the markers may be arranged randomly. In yet another embodiment, the markers may meet at least one sensing requirement of a particular application. The markers may be already present in a number of optical tactile sensor designs and may be used for complementary tactile tasks such as slip and force detection. The technique works by associating a local measure of the average local separation distance between each marker and its neighboring markers with the projected length of a fronto-parallel length element on the membrane. Under the assumption that an initial camera image of the undeformed membrane is available, a perspective camera model allows for an estimate of the local displacement of the membrane towards the image plane, in the direction of the optical axis.

In one embodiment, the recovery of surface shape from touch by the optical tactile sensor 100 may differ from the more general shape from texture problem in two important ways.

First, the distribution of texture elements or markers (referred to herein as 'textons') on the flat membrane (prior to contact) as viewed by the camera 108 under perspective projection, may be known, for example, by measurements of the textons or as pre-stored in the memory 104. As such, when the optical tactile sensor 100 is in contact with an object, one can compare the distorted camera image view with the original view. Explicit uniformity or isotropy assumptions on the distribution of the textons are not made. However, often, as in the context of the optical tactile sensor 100, such elements are distributed in a regular pattern and are of a common shape and size.

Second, an assumption is made that the 2.5D displacement of the membrane when in contact with the surface of the object is typically "small", i.e., in the order of less than a few millimeters, since the membrane may be a stiff elastomere. An assumption is also made that the texton density may be sufficiently high so as to permit an approximation of a local fronto-parallel element of the membrane.

Figure 2:
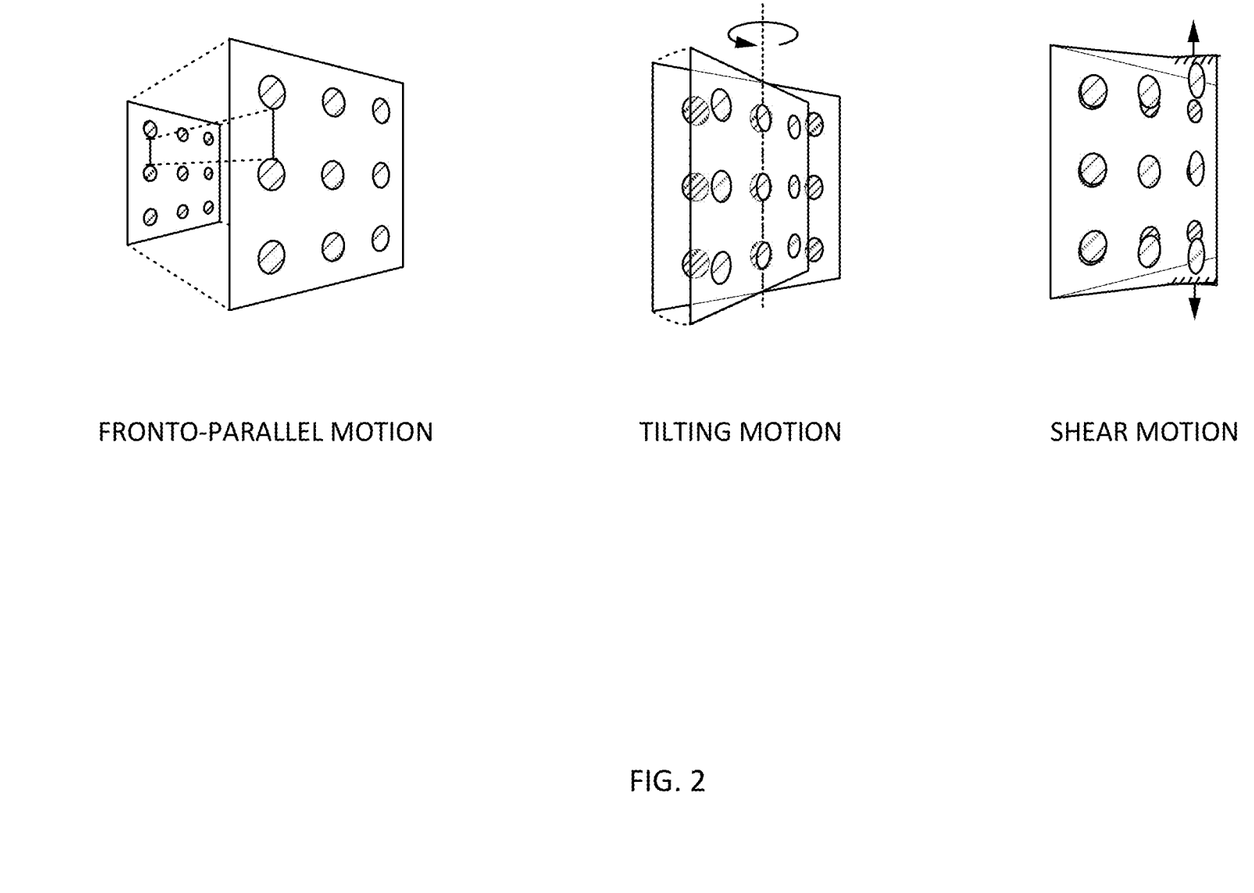
FIG. 2 illustrates sample motions that affect the space between textons.

FIG. 2 illustrates sample motions that affect the space between the textons.

In the above scenario, under a perspective camera model, when a fronto-parallel surface element moves towards the camera 108, the space between the textons will increase and the projected size of the individual elements will also increase (as shown in FIG. 2, 'fronto-parallel motion'). When a fronto-parallel surface element tilts away from the optical axis of the camera 108, texton elements that are further away will become smaller, and conversely those closer will become bigger, with the spacing between such elements decreasing (or increasing) due to a foreshortening effect (as shown in FIG. 2, 'tilting motion'). Some degree of in-plane shearing motion (as shown in FIG. 2, 'tilting motion') may also cause a change in local separation between markers which is a case that is not explicitly modeled. In the proposed approach, such a deformation is interpreted as a curving of part of the membrane surface towards the camera 108.

Figure 3:
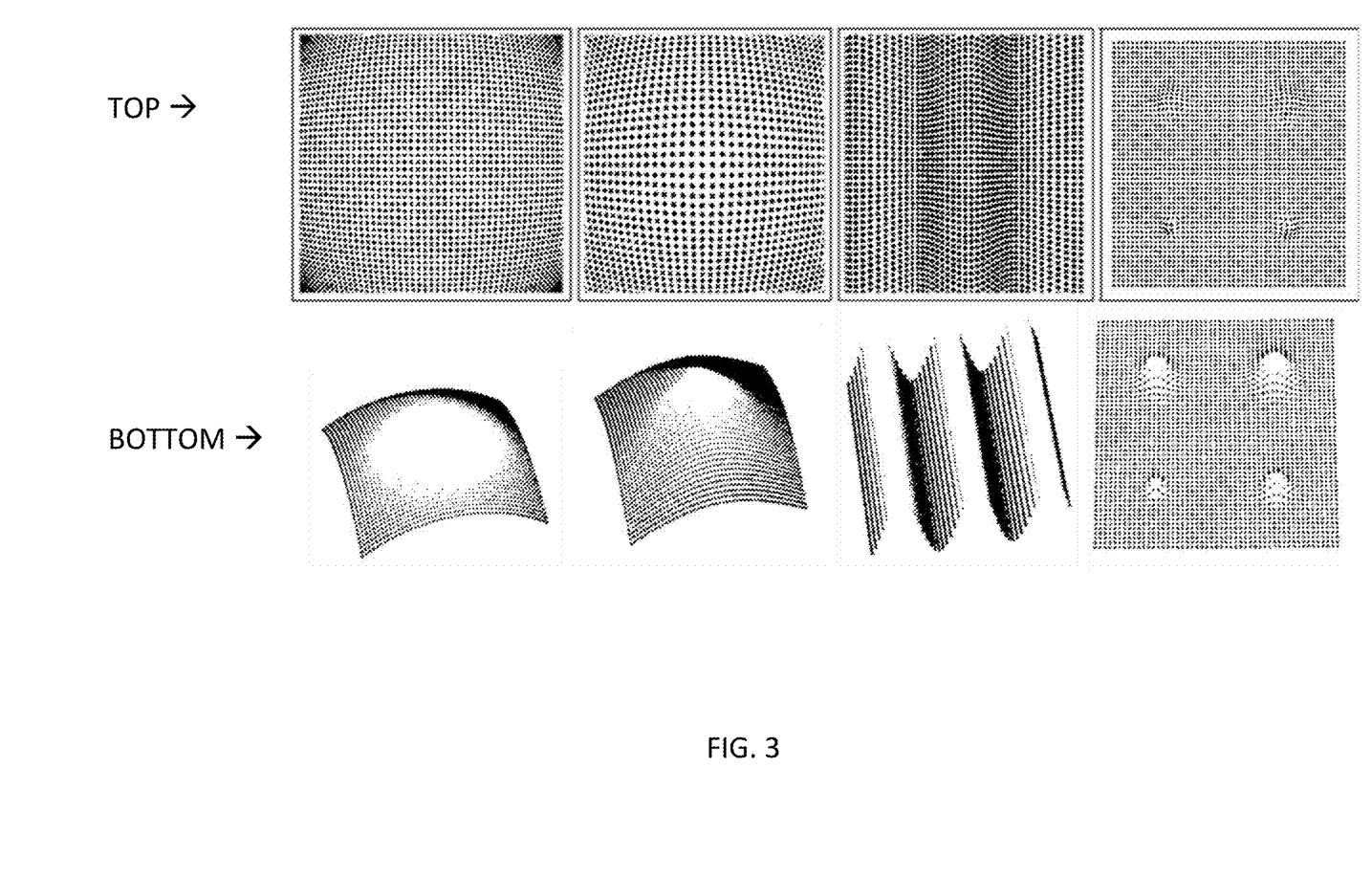
FIG. 3 illustrates multiple texton patterns of surface shapes.

FIG. 3 illustrates multiple texton patterns of surface shapes.

The above observations related to local separations between the textons have strong perceptual consequences, as illustrated in FIG. 3 (top) views of binary texton patterns from above reveal 2.5D surface shape. In these examples, each pattern was created by the deformation of an initial flat surface covered with the textons, followed by perspective projection onto the viewing plane. This motivates the following perceptual principle capturing the property that the spacing between markers is inversely proportional to distance from the camera image. Combined with a model for the camera 108, this principle may drive the contact surface shape recovery method from touch by the optical tactile sensor 100.

A feature of texton separation is described herein.

Under a perspective camera model when the optical tactile sensor 100 is in contact with an object, the change in separation between texton elements reveals the local depth ordering of contact surface points in the reference frame of the camera 108.

An increase in local separation may occur in regions where the (tactile) membrane displaces towards the camera 108, while a decrease in separation occurs in regions where the tactile membrane displaces away from the camera 108. Both processes could also involve the tilting motion shown in FIG. 2. Furthermore, the displacement may be limited so that membrane points may not be further away from the camera 108 than their initial height relative to the camera 108 when the membrane is not in touch with an external object. Were this to occur, the object would lose contact with the membrane, which being an elastomere would return to its initial flat state.

In FIG. 3, opaque spheres of a fixed physical size are placed on a synthetic surface and then viewed by the camera 108 from top down (top) and from an oblique angle (bottom). In the oblique view, the spheres may be color-coded by height above the plane to make their 3D positions explicit. Notice how the spacing of the projected spheres (top) creates a texton pattern with strong location and size cues revealing the shape of the underlying surface in the bottom row. Viewing the surface as a deformation above an initial plane, the textons get bigger and the spacing between them grows with the fronto-parallel motion towards the camera 108. When portions of the surface recede from the viewer, the spacing between the textons decreases and the textons become smaller.

Figure 4:
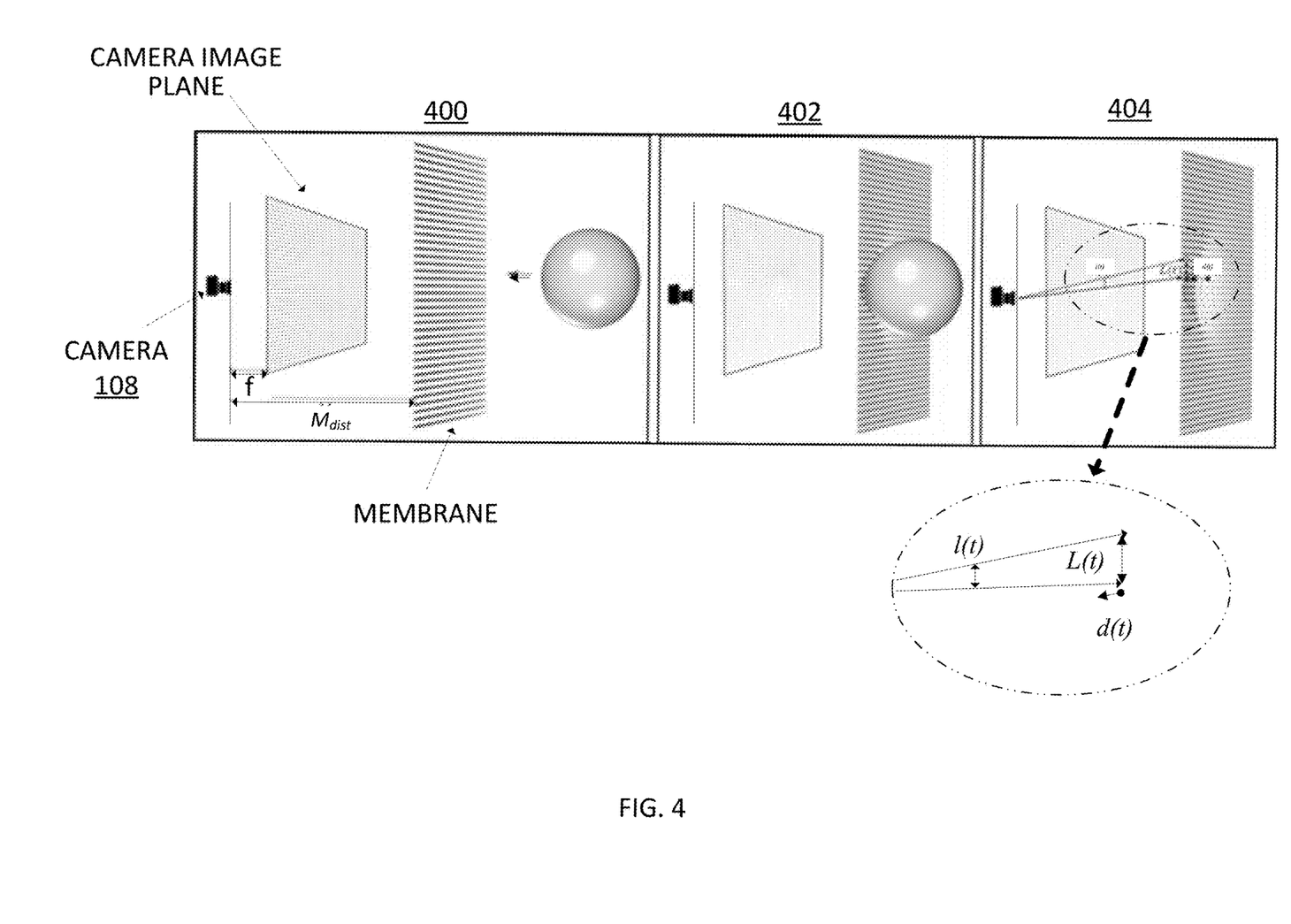
FIG. 4 illustrates an operational procedure (shape from deformation) in accordance with embodiments of the disclosure.

FIG. 4 illustrates an operational procedure (shape from deformation) in accordance with embodiments of the disclosure.

At operation 400, the camera image plane is at a fixed distance f from the camera centre of projection with the membrane at a distance $M_{dist}$ prior to contact with the object (sphere). The projection of the markers on the membrane surface is shown in black on the camera image.

At operation 402, after the contact with the object, the projected dots in the camera image undergo a deformation related to contact surface shape.

At operation 404, the local displacement d(t) of a length element L(t) on the membrane surface towards or away from the camera may be recovered by an analysis of the projected length l(t) on the camera image plane.

The above-described features make it possible to devise an operation or a method for contact shape recovery by touch, by measuring local marker separation together with a perspective projection camera model. In one embodiment, the operation or the method of the disclosure may compute the contact shape, for example, in the fronto-parallel motion while neglecting the contributions of other motions such as the tilting and the shearing.

Details of the operational procedure of the disclosure, which is shown in FIG. 4, are described herein.

A perspective projection model of the camera 108 is used within the optical tactile sensor 100. The membrane will be in contact with an object, as shown in FIG. 4 (operation 402). As illustrated in FIG. 4 (operation 400), when not in contact with the object, the initial membrane will be oriented in a direction perpendicular to an optical axis of the camera 108. Other camera configurations may also be considered such as those with an oblique camera view. For these, the projection model would have to be modified with appropriate angular correction factors.

As shown in FIG. 4 (operation 404), the membrane is deformed in the direction towards the camera image plane. The deformation of the membrane is related to the differential change in length of a fronto-parallel element in the membrane.

As shown in FIG. 4, let L(t) be the length measured from a texton element and l(t) be its projected length as measured on the camera image plane. Let $M_{dist}$ be the initial distance of the membrane to the camera 108 (the optical center of the camera 108), when the optical axis is perpendicular to the membrane and the camera image plane. Let the camera image plane be placed at a distance f from the optical center of the camera, i.e., f is the focal length. Given an appropriately chosen texture pattern, the above parameters may be extracted from the tactile image when the membrane is not in contact with an object (FIG. 4, operation 400). Using similar triangles and the perspective camera model, the following is obtained:

$$\frac{L(0)}{l(t)} = \frac{M_{dist}}{f} \quad (1)$$

When the object is in contact with the membrane (FIG. 4, operation 402), the fronto-parallel length element still has length L(t)=L(0) (the fronto-parallel motion in FIG. 2), but has been displaced at time t by an amount d(t) towards or away from the camera leading to a new projected length in the camera image plane of l(t). Using similar triangles, $$\frac{L(0)}{l(t)} = \frac{M_{dist} - d(t)}{f} \quad (2)$$

In other words, the distance between the camera 108 and the membrane is reduced by amount d(t) because the membrane is contacted by the object (FIG. 4, operation 402). Thus, the new distance between the camera 108 and the membrane is ($M_{dist}$−d(t)).

Since f and $M_{dist}$ are fixed quantities, the length element towards the camera d and its length in physical space L(0) is recovered by measuring l(0), l(t) in the camera image plane. In particular, using (1) and (2), the following is obtained:

$$d(t) = M_{dist} \cdot \left(1 - \frac{l(0)}{l(t)}\right) \quad (3)$$

Hence, the displacement of the fronto-parallel length element towards the camera (d(t)) may be recovered from image information ($M_{dist}$, l(0), l(t)). Since the analysis applies independently for each projected length element, the recovered displacement d(t) is itself a scalar function of location (pixel coordinates) in the image plane.

Furthermore, contact surface depth recovery may performed when the sensor is in contact with an object. A feature of the disclosure is to associate with at least one marker a measure of its average local separation, defined by Euclidean distance in the camera image plane to its closest neighbor. For the at least one marker, this separation distance serves as a proxy for the projected length element l(t) in the camera image plane of the fronto-parallel membrane length element L(t).

FIG. 4 illustrates that the optical axis of the camera 108 is perpendicular to the camera image plane and the membrane, with parameters f (the focal length) and $M_{dist}$ (the distance of the membrane from the camera image prior to contact). The camera image of the membrane is referred to as the 'tactile image.'

An image of the flat membrane (with no object is in contact) is available and the markers on the membrane are visually distinct so that they may be easily segmented. For example, the markers may be fluorescent for easy and reliable segmentation using adaptive thresholding on a suitable color channel. For more complex situations, a segmentation network may be trained to provide robust marker segmentation. For robustness, the centroid is computed for each segmented marker and tracked across time using a Kalman filter, which may allow for removal of outliers which might occur across a sequence due to segmentation errors.

A structure of the plurality of makers may be computed. In one embodiment, each marker location is associated with a measure of its separation from neighboring markers by computing its distance from the medial axis of the background region, as illustrated in FIG. 3 (top). In effect, this measurement may serve as a proxy for the projection l(t) of a length element L(t) on the membrane. This quantity may be computed over the entire camera image plane by calculating an outward Euclidean distance function from the medial axis. As the membrane undergoes contact with an object, the markers are displaced and using the above equation (3), it may be possible to recover d(xi, yi) at a marker's centroid location (xi, yi), over i=1, ..., N markers, to obtain a 2.5D reconstruction of the contact surface.

Figure 5:
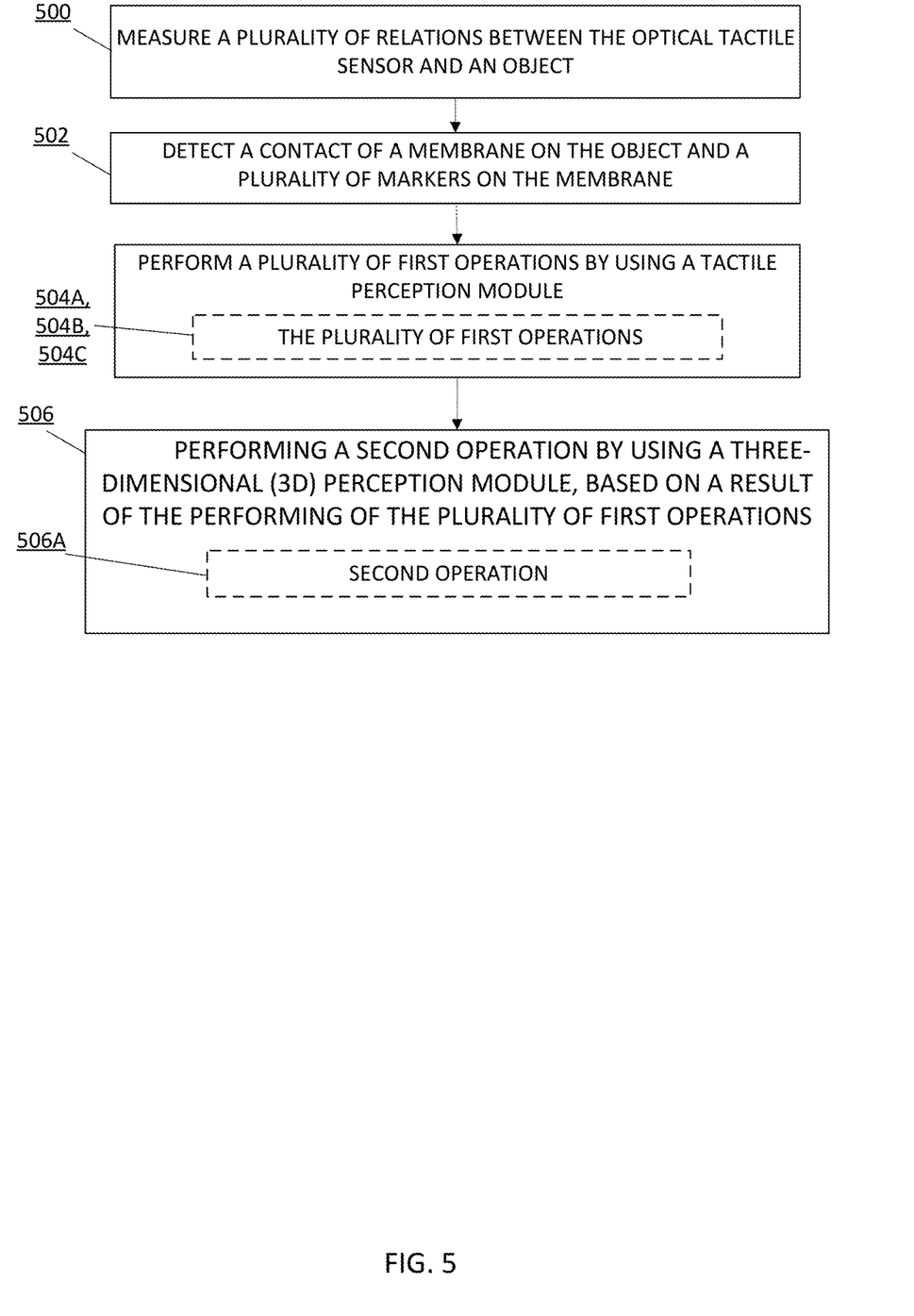
FIG. 5 illustrates an operation procedure in accordance with some embodiments of the disclosure.

FIG. 5 illustrates an operation procedure in accordance with embodiments of the disclosure. At operation 500, a plurality of relations between the optical tactile sensor and an object are measured by the optical tactile sensor 100. In one embodiment, the plurality of relations between the optical tactile sensor and the object includes a fixed distance (f) between a camera and an image plane of the camera and a distance ($M_{dist}$) between the camera 108 and the membrane.

At operation 502, a contact of a membrane on the object and a plurality of markers on the membrane are detected by the optical tactile sensor 100.

At operation 504, a plurality of first operations is performed by the optical tactile sensor 100 by using a tactile perception module that may be stored in the memory 104. In one embodiment, the tactile perception module includes software codes or programs about the plurality of first operations. In one embodiment, the tactile perception module includes software codes or programs about the above-described equations (1), (2), and (3).

At operation 506, a second operation is performed by the optical tactile sensor 100 by using a three-dimensional (3D) perception module, based on a result of the performing of the plurality of first operations. In one embodiment, the 3D perception module may be stored in the memory 104. In one embodiment, the 3D perception module includes software codes or programs about the second operation.

Figure 6:
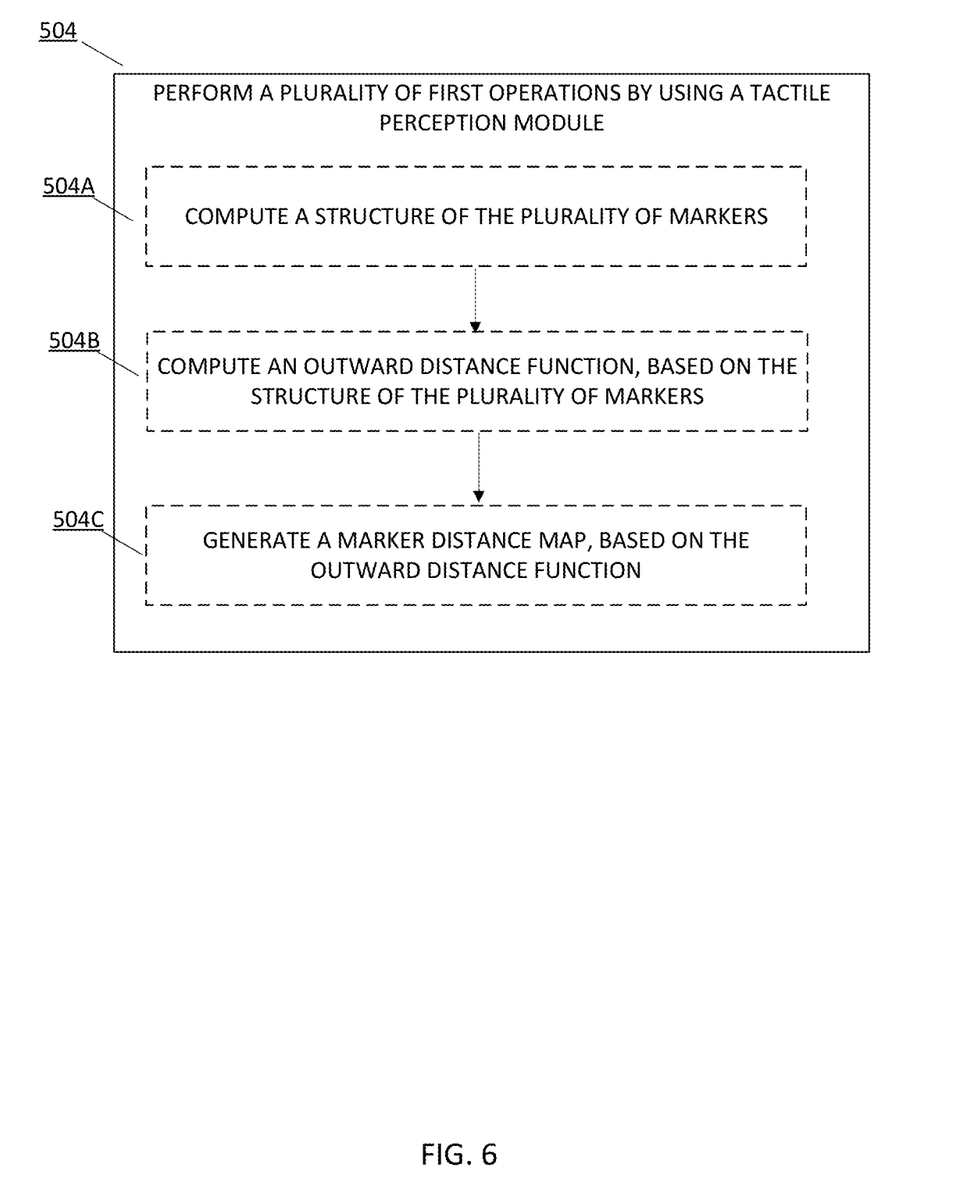
FIG. 6 illustrates an operation procedure in accordance with some embodiments of the disclosure.

FIG. 6 illustrates an operation procedure in accordance with embodiments of the disclosure. Specifically, in the operation procedure of FIG. 6, the plurality of first operations (shown in FIG. 5, operation 504) may include the following operations: computing a structure of the plurality of markers (e.g., a plurality of medial axis of the plurality of markers) (operation 504A); computing an outward distance function, based on the structure of the plurality of markers (e.g., the plurality of medial axis) (operation 504B); and generating a marker distance map, based on the outward distance function (operation 504C).

Figure 7:
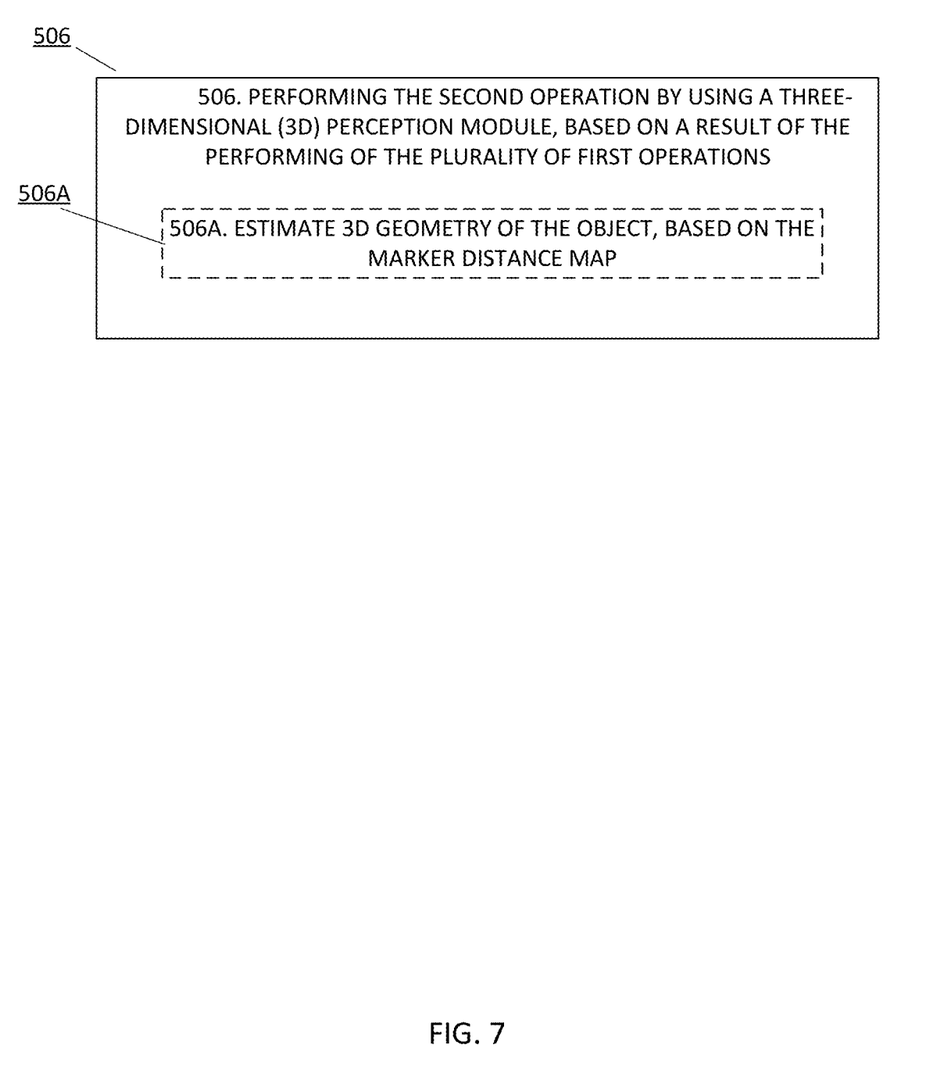
FIG. 7 illustrates an operation procedure in accordance with some embodiments of the disclosure.

FIG. 7 illustrates an operation procedure in accordance with embodiments of the disclosure. Specifically, in the operation procedure of FIG. 7, the result of the plurality of first operations includes the marker distance map, and the second operation (shown in FIG. 5, operation 506) includes an operation of estimating 3D geometry of the object, based on the marker distance map (operation 506A).

The operation procedures, which are illustrated in FIGS. 5 to 7 and described above, may be performed by the optical tactile sensor 100. In one embodiment, the optical tactile sensor 100 may include a membrane, a plurality of markers on the membrane, the memory 104, and the camera 108.

Figure 8:
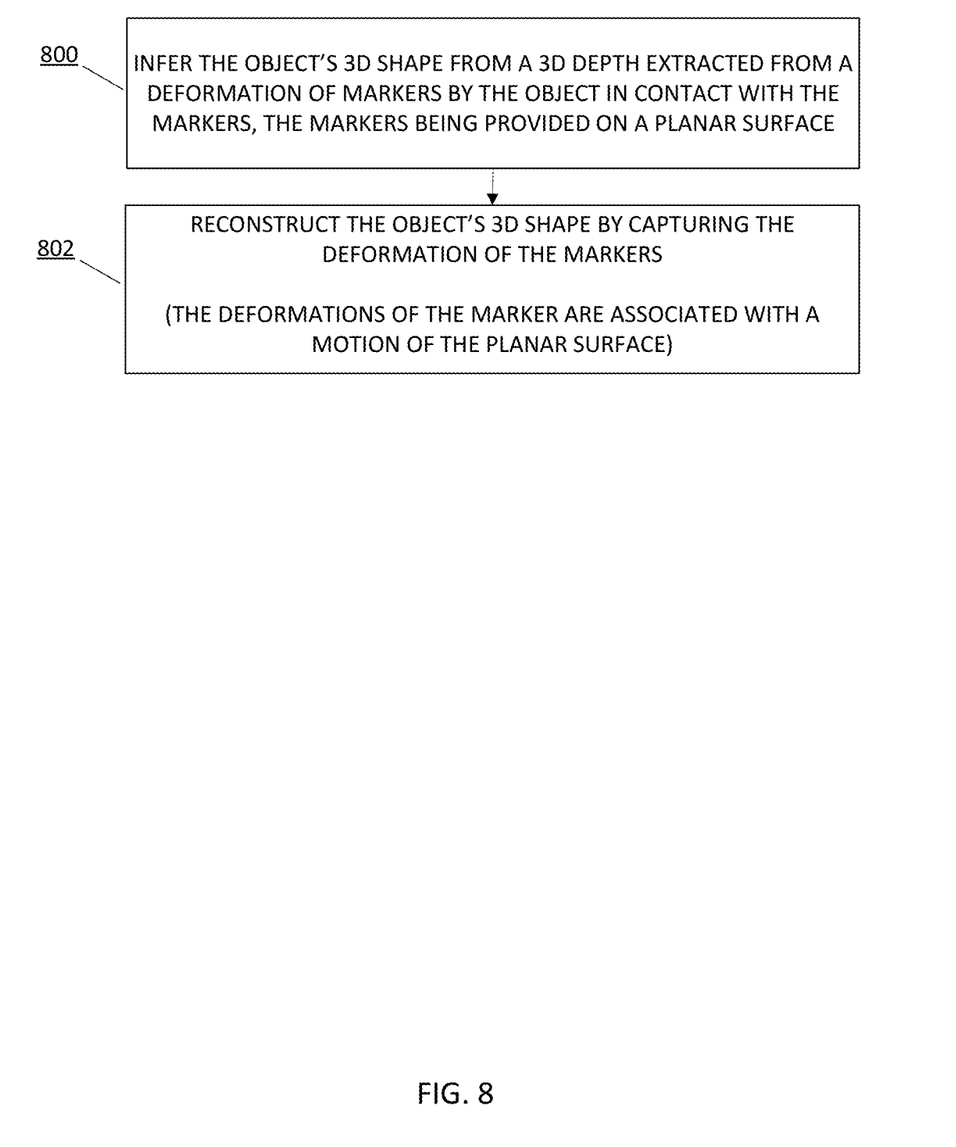
FIG. 8 illustrates an operation procedure in accordance with some embodiments of the disclosure.

FIG. 8 illustrates an operation procedure in accordance with embodiments of the disclosure. In one embodiment, the operation procedure is performed by the optical tactile sensor 100 for reconstructing an object's 3D shape from touch. Specifically, the operation procedure of FIG. 8 includes the following operations: inferring the object's 3D shape from a 3D depth extracted from a deformation of markers by the object in contact with the markers, the markers being provided on a planar surface (operation 800); and reconstructing the object's 3D shape by capturing the deformation of the markers (operation 802). The deformations of the marker are associated with a motion of the planar surface.

What is claimed is:

1. A method performed by an optical tactile sensor comprising a camera, the method comprising:
measuring a plurality of relations between the optical tactile sensor and an object;
detecting a contact of a membrane on the object;
detecting a plurality of markers on the membrane;
performing a plurality of first operations by using a tactile perception module; and
performing a second operation by using a three-dimensional (3D) perception module, based on a result of the performing of the plurality of first operations
wherein the result of the plurality of first operations comprises a marker distance map, and
wherein the second operation comprises 3D geometry of the object, based on the marker distance map,
wherein the marker distance map comprises calculating $$d(t) = M_{dist} \cdot \left(1 - \frac{l(0)}{l(t)}\right)$$

wherein d(t) is a displacement of the membrane towards a camera image plane when the membrane is in contact with the object, Mdist is an initial distance between the camera and an initial membrane, and
wherein, when the membrane is not in contact with the object, the initial membrane is oriented in a direction perpendicular to an optical axis of the camera, l(t) is a projected length as measured on the camera image plane, when the membrane is deformed after the contact with the object, in the direction towards the camera image plane, and l(0) is an initial projected length as measured on the camera image plane when the membrane is not in contact with the object.

2. The method of claim 1, wherein the plurality of relations between the optical tactile sensor and the object comprises:
a fixed distance (f) between the camera and the camera image plane; and
the distance (Mdist) between the camera and the membrane.

3. The method of claim 1, wherein the performing of the plurality of first operations by using the tactile perception module, comprises:
computing a structure of the plurality of markers;
computing an outward distance function, based on the structure of the plurality of markers; and
generating the marker distance map, based on the outward distance function.

4. The method of claim 3, wherein the structure of the plurality of markers comprises a plurality of medial axes of the plurality of markers.

5. The method of claim 1, wherein the plurality of markers comprises a N×N grid.

6. The method of claim 1, wherein the plurality of markers has a random formation.

7. An optical tactile sensor comprising:
a membrane;
a plurality of markers on the membrane;
a memory;
a camera;

at least one processor operatively connected to the memory, the at least one processor configured to:
  measure a plurality of relations between the optical tactile sensor and an object,
  detect a contact of the membrane on the object,
  detect the plurality of markers,
  perform a plurality of first operations by using a tactile perception module in the memory, and
  perform a second operation by using a three-dimensional (3D) perception module in the memory, based on a result of the plurality of first operations,
wherein the result of the plurality of first operations comprises a marker distance map,
wherein the second operation comprises 3D geometry of the object, based on the marker distance map, and
wherein the marker distance map comprises calculating $$d(t) = M_{dist} \cdot \left(1 - \frac{l(0)}{l(t)}\right)$$

wherein d(t) is a displacement of the membrane towards a camera image plane when the membrane is in contact with the object, Mdist is an initial distance between the camera and an initial membrane, and
wherein, when the membrane is not in contact with the object, the initial membrane is oriented in a direction perpendicular to an optical axis of the camera, l(t) is a projected length as measured on the camera image plane, when the membrane is deformed after the contact with the object, in the direction towards the camera image plane, and l(0) is an initial projected length as measured on the camera image plane when the membrane is not in contact with the object.

8. The optical tactile sensor of claim 7, wherein the plurality of relations between the optical tactile sensor and the object comprises:
  a fixed distance (f) between the camera and the camera image plane; and
  the distance (Mdist) between the camera and the membrane.

9. The optical tactile sensor of claim 7, wherein the plurality of first operations by using the tactile perception module in the memory, includes:
  computing a structure of the plurality of markers;
  computing an outward distance function, based on the structure of the plurality of markers; and
  generating the marker distance map, based on the outward distance function.

10. The optical tactile sensor of claim 9, wherein the structure of the plurality of markers comprises a plurality of medial axes of the plurality of markers.

11. The optical tactile sensor of claim 7, wherein the plurality of markers comprises a N×N grid.

12. The optical tactile sensor of claim 7, wherein the plurality of markers has a random formation.

13. A method performed by an optical tactile sensor for reconstructing a three-dimensional (3D) shape of an object from touch, comprising:
  inferring the 3D shape of the object from a 3D depth extracted from a deformation of markers by the object being in contact with the markers, the markers being provided on a planar surface; and
  reconstructing the object's 3D shape by capturing the deformation of the markers,
  wherein the deformation of the markers is associated with a motion of the planar surface,
  wherein the inferring the 3D shape of the object comprises a marker distance map, and
  wherein the reconstructing the object's 3D shape comprises 3D geometry of the object, based on the marker distance map,
  wherein the marker distance map comprises calculating $$d(t) = M_{dist} \cdot \left(1 - \frac{l(0)}{l(t)}\right)$$

wherein d(t) is a displacement of the planar surface towards a camera image plane when the planar surface is in contact with the object, Mdist is an initial distance between a camera and an initial planar surface, and
  wherein, when the planar surface is not in contact with the object, the initial planar surface is oriented in a direction perpendicular to an optical axis of the camera, l(t) is a projected length as measured on the camera image plane, when the planar surface is deformed after the contact with the object, in the direction towards the camera image plane, and l(0) is an initial projected length as measured on the camera image plane when the planar surface is not in contact with the object.

14. The method of claim 13, wherein the planar surface is a surface of a membrane of the optical tactile sensor.

15. The method of claim 13, wherein the motion of the planar surface is a fronto-parallel motion or a tilting motion.

* * * * *